US007890249B2

(12) United States Patent
Davis et al.

(10) Patent No.: US 7,890,249 B2
(45) Date of Patent: Feb. 15, 2011

(54) SYSTEM AND METHOD FOR DETERMINING A CENTER OF GRAVITY OF AN AIRCRAFT

(75) Inventors: Dick E. Davis, Arlington, TX (US); James R. Emmons, Arlington, TX (US); Amith M. Kalaghatagi, Arlington, TX (US); George R. Lindberg, Fort Worth, TX (US); James A. Johnston, Burleson, TX (US)

(73) Assignee: Nordic Industries, Inc., Arlington, TX (US)

( * ) Notice: Subject to any disclaimer, the term of this patent is extended or adjusted under 35 U.S.C. 154(b) by 396 days.

(21) Appl. No.: 12/167,983

(22) Filed: Jul. 3, 2008

(65) Prior Publication Data

US 2009/0064769 A1 Mar. 12, 2009

Related U.S. Application Data

(60) Provisional application No. 60/948,400, filed on Jul. 6, 2007.

(51) Int. Cl.
*G06G 7/70* (2006.01)
*G01M 1/12* (2006.01)
*G06F 17/17* (2006.01)

(52) U.S. Cl. ............... 701/124; 73/65.05; 73/65.06

(58) Field of Classification Search ........... 73/65.05, 73/65.06, 802; 701/124
See application file for complete search history.

(56) References Cited

U.S. PATENT DOCUMENTS

| 3,513,300 | A | * | 5/1970 | Elfenbein et al. | ............ 701/124 |
| 3,638,477 | A | * | 2/1972 | Brummer | ................... 73/65.06 |
| 5,214,586 | A | * | 5/1993 | Nance | ......................... 701/124 |
| 6,353,793 | B1 | * | 3/2002 | Godwin et al. | .............. 701/124 |
| 6,564,142 | B2 | * | 5/2003 | Godwin et al. | .............. 701/124 |
| 2008/0046168 | A1 | * | 2/2008 | McCarthy et al. | ........... 701/124 |
| 2008/0119967 | A1 | * | 5/2008 | Long et al. | ..................... 701/3 |
| 2010/0121560 | A1 | * | 5/2010 | Vetsch | ........................ 701/124 |

OTHER PUBLICATIONS

Aircraft Proving Grounds Aircraft Center of Gravity Calculator, May 3, 2005, Geistware of Indiana. Accessed online at <http://www.geistware.com/rcmodeling/cg_super_calc.htm>.*

* cited by examiner

*Primary Examiner*—Lisa M Caputo
*Assistant Examiner*—Punam Roy
(74) *Attorney, Agent, or Firm*—Baker Botts L.L.P.

(57) ABSTRACT

According to one embodiment of the disclosure, a method of determining a center of gravity of an aircraft includes receiving a strut length for each of the gears of an aircraft, determining an arm length for each of the gears, and determining a center of gravity of the aircraft based on a relationship between the center of gravity and respective arm lengths for each of the gears. The arm length of each of the gears is determined according to the strut length of a gear strut of a respective gear and a relationship between the strut length of the gear strut to another gear of another aircraft and the arm length of the respective gear.

21 Claims, 7 Drawing Sheets

US 7,890,249 B2

SYSTEM AND METHOD FOR DETERMINING A CENTER OF GRAVITY OF AN AIRCRAFT

RELATED APPLICATIONS

This application claims priority to U.S. Provisional Patent Application Ser. No. 60/948,400, entitled "SYSTEM AND METHOD FOR DETERMINING A CENTER OF GRAVITY OF AN AIRCRAFT," which was filed on Jul. 6, 2007.

TECHNICAL FIELD OF THE INVENTION

This disclosure relates generally to the field of aircraft measurements and, more particularly, to a system and method of determining a center of gravity of an aircraft.

BACKGROUND OF THE INVENTION

Two critical design/operational features of an aircraft are (1) the aircraft's weight and (2) the aircraft's center of gravity or center of gravity. Due to the importance of these features, both are measured at various times, including when the aircraft is empty and when the aircraft is loaded just prior to take off.

SUMMARY OF THE INVENTION

According to one embodiment of the disclosure, a method of determining a center of gravity of an aircraft includes measuring the strut length of each of the gears of an aircraft, deriving an arm length of each of the gears according to a correlation formula and the measured strut lengths, and determining a center of gravity of the aircraft according to the derived arm lengths of each gear. The correlation formula is generated for each gear of the aircraft by locating a reference datum of the aircraft, inflating its gear strut to a plurality of inflation levels, measuring and recording the strut length and an arm length at each of the inflation levels, and fitting a curve through a plot of the plurality of measured strut lengths versus the plurality of measured arm lengths to yield the correlation formula.

Certain embodiments of the disclosure may provide numerous technical advantages. For example, a technical advantage of one embodiment may include the capability to decrease the time it takes to calculate the center of gravity of an aircraft. Other technical advantages of other embodiments may include the capability to decrease the danger involved with calculating the center of gravity of an aircraft. Yet other technical advantages of other embodiments may include the capability to increase the accuracy in calculating the center of gravity of an aircraft. Still yet other technical advantages of other embodiments may include the capability to avoid interrupting the integrity of how the aircraft is designed to operate.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present disclosure and its advantages, reference is now made to the following description, taken in conjunction with the accompanying drawings, in which.

DETAILED DESCRIPTION OF EXAMPLE EMBODIMENTS OF THE INVENTION

It should be understood at the outset that although example embodiments of are illustrated below, other embodiments may be implemented using any number of techniques, whether currently known or in existence. The disclosure should in no way be limited to the example embodiments, drawings, and techniques illustrated below, including the embodiments and implementation illustrated and described herein. Additionally, the drawings are not necessarily drawn to scale.

There are variety of techniques currently used to measure a center of gravity (CG) and mean aerodynamic chord (MAC). One commonly used technique for measuring the center of gravity and mean aerodynamic chord involves initially leveling the aircraft's attitude to flight level conditions, for example, using the landing gear struts. As one example, nitrogen may be added or removed from the struts until the aircraft is level. Once the aircraft is level, a plumb line can be dropped at a location for the datum (e.g., using a plumb bob), and chalk lines can be drawn at a center line of the landing gears. Distances between the landing gears and datum may then be determined using appropriate measurement techniques. And, the weight of each respective landing gear can measured using scales. With these distances and weights, moment arms from the datum can be calculated. Then, center of gravity and mean aerodynamic chord can be calculated by taking the total moment (sum of moment arms) divided by the total weight of the aircraft. Other similar techniques of determining center of gravity and mean aerodynamic chord are described in a publication of the Federal Aviation Administration, FAA-H-8083-1A, in Chapter 3, entitled Weighing the Aircraft and Determining the Empty Weight Center of Gravity.

These conventional measuring techniques are time consuming (e.g., measurements may take several hours), dangerous (e.g., due to problem that may occur in jacking the aircraft), prone to human errors, and may interrupt the integrity of how the aircraft is designed to operate. For example, if the landing gear strut pressures and volume are changed, the aircraft is considered out of service until such time after the weighing that the gear can be re-serviced.

Accordingly, teaching of some embodiments recognize a system and method that may reduce the time involved in determining an aircraft's center of gravity, increase the accuracy of the center of gravity measurements, and decrease or eliminate interruptions to the integrity of how the aircraft is designed to operate. Teachings of some embodiments also recognize a system an method that calculates center of gravity within a tenth of inch and mean aerodynamic chord within 0.1% over a reduced period as compared to conventional techniques. FIGS. 1 through 7 discuss various details of embodiments of the disclosure.

Figure 1:
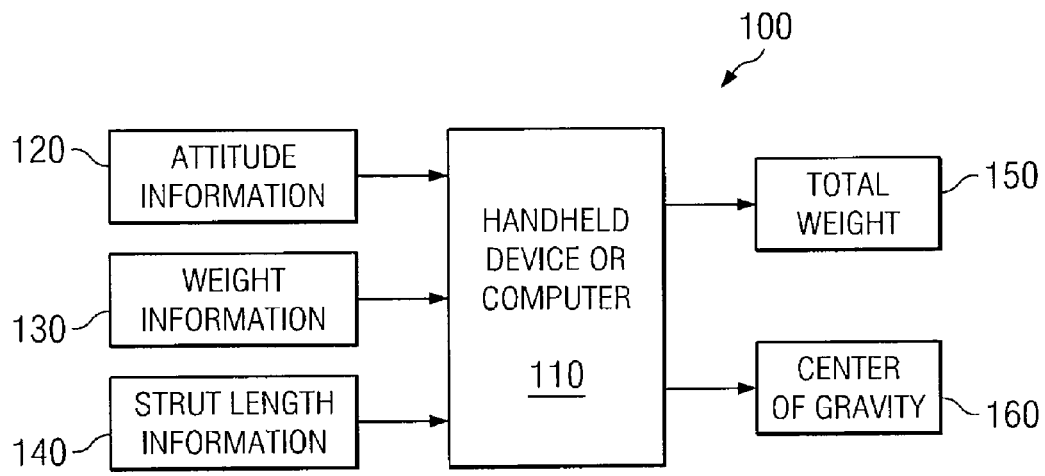
FIG. 1 graphically illustrates a system, according to an embodiment of the disclosure.

FIG. 1 graphically illustrates a system 100, according to an embodiment of the disclosure. In the graphically illustrated system 100 of FIG. 1, a handheld device or computer 110 receives three pieces of information: (1) aircraft attitude information 120 (e.g., as may be determined by an inclinometer or other device), (2) weight information 130 (e.g., as measured by scales and which may be transmitted wirelessly), and (3) exposed strut length information 140 (e.g., as may be associated with a wheel's landing gear). Based upon these three pieces of information and other data that is either stored on or obtainable by the handheld device or computer 100, two pieces of information can be yielded: (1) the total weight of the aircraft 150, and (2) the location of the center of gravity (CG) of the aircraft 160. The mean aerodynamic chord (MAC) may also be determined. Additionally, in particular embodiments, the handheld system 100 may be used to calculate the total weight 150 and center of gravity 160 in minutes rather than hours.

In particular embodiments, the two yielded measurements (total weight 150 and center of gravity 160) can be produced for an empty weight aircraft, such as an empty weight center of gravity (EWCG), a loaded aircraft, or both. In embodiments in which the total weight 150 and center of gravity 160 are determined for a weighted aircraft, such measurements may be determined directly before pushback for a particular flight. Calculating the measurements at both points in time (empty weight and loaded) may allow a quick determination as to how much the load has caused the empty weight center of gravity to shift. Further details of the system 100 and associated methods will be described below.

Figure 2:
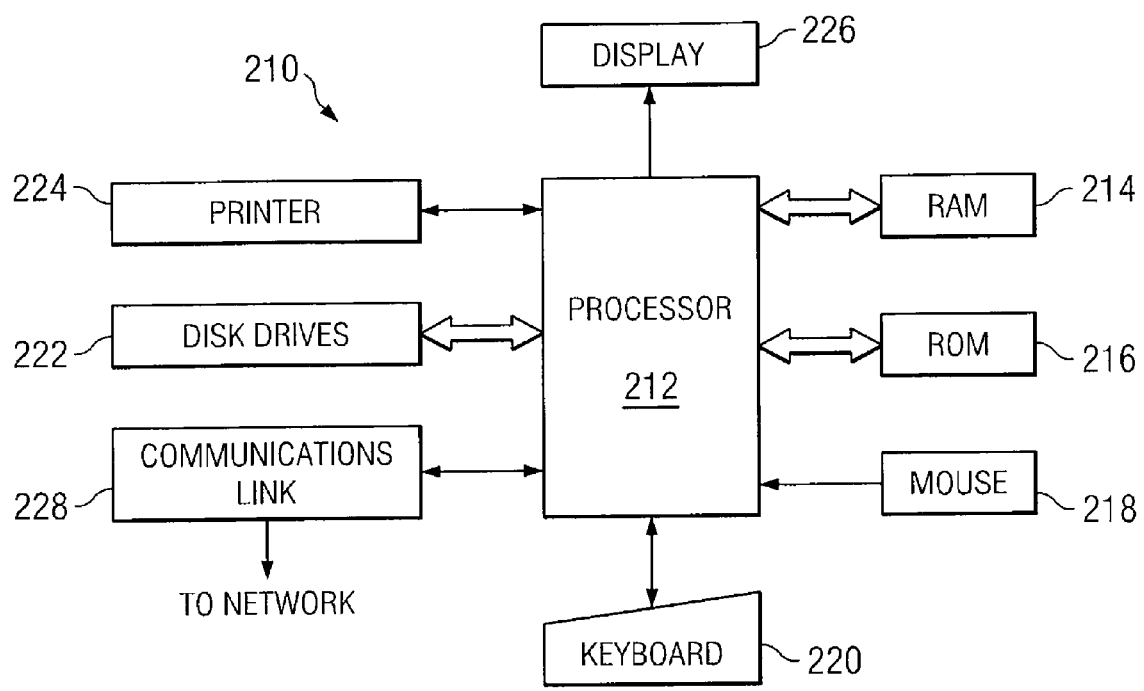
FIG. 2 shows an embodiment of a general purpose computer that may be used in connection with one or more pieces of software and/or hardware employed by other embodiments of the disclosure.

FIG. 2 shows an embodiment of a general purpose computer 210 that may be used in connection with one or more pieces of software and/or hardware employed by other embodiments of the disclosure. General purpose computer 210 may be adapted to execute any of the well-known OS2, UNIX, Mac-OS, Linux, and Windows Operating Systems (including Window CE) or other operating systems. The general purpose computer 210 in the embodiment of FIG. 2 comprises a processor 212, a random access memory (RAM) 214, a read only memory (ROM) 216, a mouse 218, a keypad or keyboard 220 and input/output devices such as a printer 224, disk drives 22, a display 26 and a communications link 228. In other embodiments, the general purpose computer 210 may include more, fewer, or other component parts. As an example, the general purpose computer may be imbedded within a handheld device with touch screen inputs and a key pad embedded thereon.

Embodiments of the present disclosure may include programs that may be stored in random access memory 214, the read only memory 16, disk drives 222, or other suitable memory and may be executed by the processor 212. The communications link 228 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; radio communications; a satellite network; an enterprise intranet; other suitable communication links; or any combination of the preceding. To facilitate the aforementioned wireless communication, the computer 210 may include suitable communication items, including antennas and the like.

Disk drives 222 may include a variety of types of storage media such as, for example, floppy disk drives, hard disk drives, CD ROM drives, DVD ROM drives, magnetic tape drives or other suitable storage media. Although this embodiment describes a plurality of disk drives 222, a single disk drive 222 may be used without departing from the scope of the disclosure.

Although FIG. 2 provides one embodiment of a computer that may be used with other embodiments of the disclosure, other embodiments of a computer may additionally utilize computers other than general purpose computers as well as general purpose computers without conventional operating systems. Additionally, embodiments of the disclosure may also employ multiple general purpose computers 210 or other computers networked together in a computer network. Most commonly, multiple general purpose computers 210 or other computers may be networked through the Internet and/or in a client server network. Embodiments of the disclosure may also be used with a combination of separate computer networks each linked together by a private or a public network.

Several embodiments of the disclosure may include logic contained within a computer-readable medium. In the embodiment of FIG. 2, the logic comprises computer software executable on the general purpose computer 210. The medium may include the random access memory 214, the read only memory 216 or the disk drives 222. In other embodiments, the logic may be contained within hardware configuration or a combination of software and hardware configurations. The logic may also be embedded within any other suitable medium without departing from the scope of the disclosure.

Figures 3, 4A:
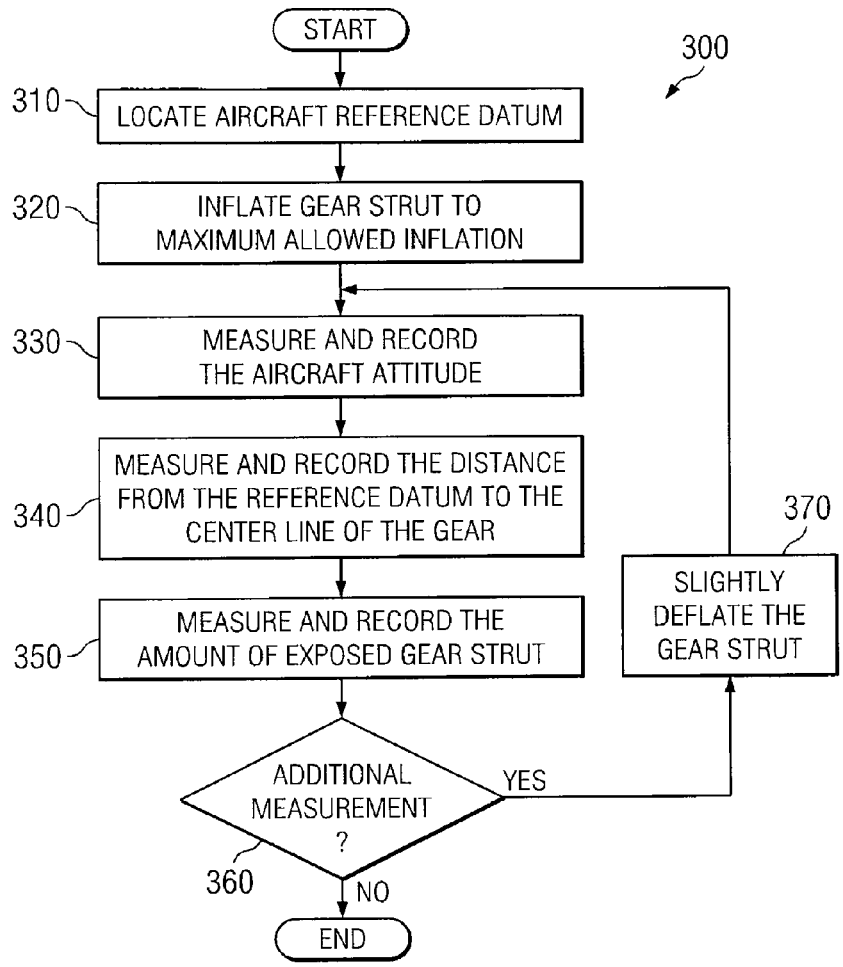
FIG. 3 illustrates a method of gathering strut length correlation data, according to an embodiment of the disclosure.
FIGS. 4A, 4B, and 4C illustrate an analyzing and manipulating of arm data, according to an embodiment of the disclosure.

FIG. 3 illustrates a method 300 of gathering strut length correlation data, according to an embodiment of the disclosure. As will be described in further details below, the gathered strut length correlation data may be used to correlate an arm length of a particular gear from a particular datum with an exposed length of a gear's strut. The method 300 may be used for each gear, for example, the nose gear, the main gears, and the like. In other words, the method 300 may individually be used to gather data for each gear.

The method 300 of FIGURE commences with a step of 310 of locating the reference datum of the aircraft. A variety of different locations may be used as the reference datum as long as all arm measurements are taken from the same reference datum. In particular embodiments, the reference datum of the aircraft may be the aircraft's fuselage station.

After step 310, the method 300 may proceed to inflating the particular gear strut to maximum allowed inflation at step 320. In particular embodiments, step 320 may be carried out by adding nitrogen or other suitable material to extend the strut.

After step 320, the method 300 may proceed to a measuring and recording of the distance from the reference datum to the center line of the gear at step 340. Any of a variety of techniques may be used to take and record this measurement, including traditional techniques involving chalk lines and more advance techniques which utilize lasers and propagated electromagnetic waves. In particular embodiments, the measurements may be recorded to a tenth of an inch accuracy. In other embodiments, the measurements may be recorded in increments less than tenths of an inch or in increments greater than a tenth of an inch.

After step 340, the method 300 may proceed to a measuring and recording the amount of exposed gear strut at step 350. In particular embodiments, the amount of exposed gear strut may be the amount of exposed chrome (in aircraft that utilize chrome in the struts). In other embodiments, the amount of exposed gear strut may be the amount that some other material is exposed. Step 350 may be carried out in particular embodiments using calipers, lasers, or other suitable measurement devices.

After step 350, the method 300 may proceed to a decisional step 360 of determining whether additional measurements need to be made. As one example, the gear strut may have additional deflation that it may undergo. Accordingly, additional measurements can be made. If no additional measurements are made, the method 300 ends. If additional measurements are made, at step 370 the gear strut is slightly deflated and the method repeats steps 340, and 350. In particular embodiments, at least three strut measurements are made from a maximum inflation of the gear strut to a complete deflation of the gear strut. In other embodiments, ten or more measurements are made from a maximum inflation of the gear strut to a complete deflation of the gear strut.

As alluded to above, the method 300 may be used for each respective landing gear strut, for example, the nose gear, the main gear, and the like. The method 300 may primarily be used to determine a longitudinal distance of a center line of a gear to the reference datum for a particular amount of exposed strut. However, the method 300 may also be used to determine a lateral distance of a center line of a gear to a reference datum for a particular amount of exposed strut.

Once the data has been gather through several iterations and/or executions of the method of 300, the data can be analyzed and manipulated as described with reference to FIGS. 4A, 4B, and 4C.

Figure 4B:
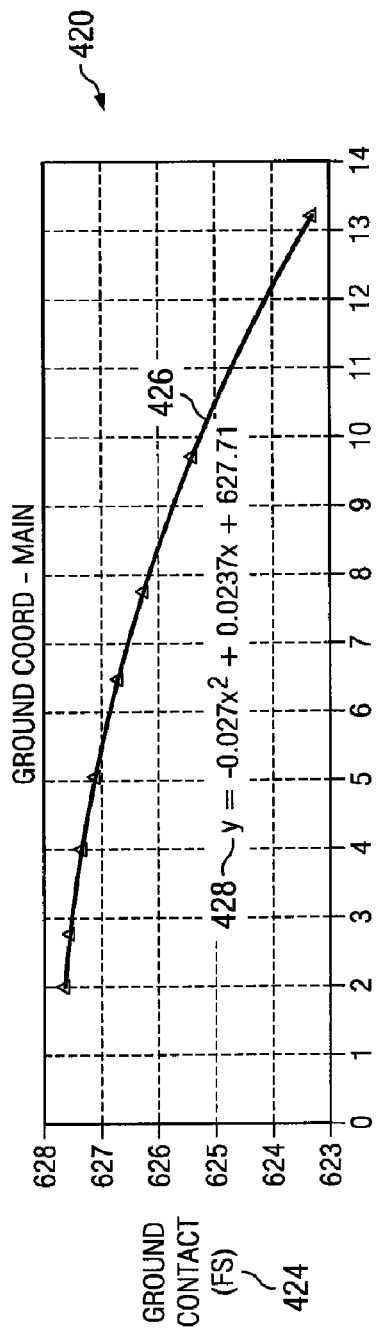
Figure 4C:
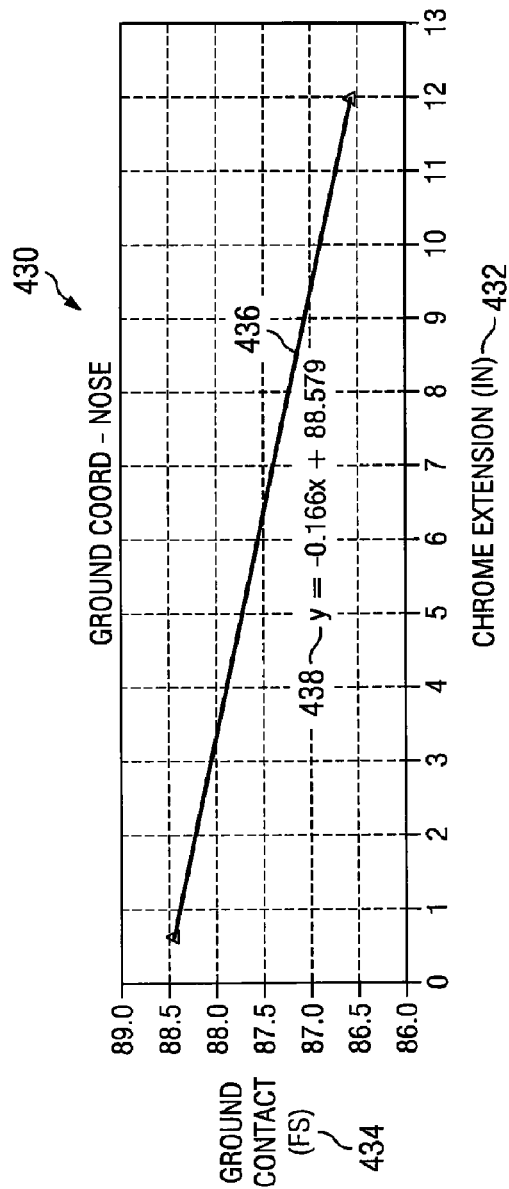

FIGS. 4A, 4B, and 4C illustrate an analyzing and manipulating of arm data, according to an embodiment of the disclosure. FIG. 4A show a chart 410 that may represent data gathered, for example, using the method of FIG. 3 in particular embodiments. In other embodiments, an aircraft manufacture may provide some or all of the data for the chart 410 of FIG. 4A.

The chart 410 of FIG. 4A includes measurements for a nose gear and a main gear. A column 412 labeled "Chrome" corresponds to the amount of chrome or strut exposed for the particular gear (in inches). Column 414 and column 416, respectively labeled "FS" and "WL," correspond to the arm length (in inches) or distance from the center line of the gear to the fuselage station (FS) and water line (WL). These respective measurements on chart 410 for the fuselage station are shown on graph 420 of FIG. 4B and graph 430 of FIG. 4C.

FIGS. 4B and 4C show graphs 420 and 430, mapping out exposed strut lengths against arm lengths from a fuselage station, according to an embodiment of the disclosure. The strut lengths in this embodiment are chrome extensions 422 and 432 (in inches) and arm length to the fuselage station 424 and 434 (in inches). With each of these plots, a curve or line 426 or 436 can be fit through each of the points to arrive at formula 428 and 438. Any of a variety of curve fitting algorithms may be utilized, which will become apparent to one of ordinary skill in the art after review of the specification. Examples include, but are not limited to, least squares algorithms, straight line fit algorithms, and quadratic equation algorithms. With the formulas 428 and 438, any arm length to the fuselage station can be calculated given an exposed strut length. That is, given an X value (chrome extension length in inches), we can mathematically determine the arm length (distance from the fuselage station in inches), Y. With these arm lengths and weights, the moment and ultimately, the center of gravity can be determined using the common formula: total moment (sum of moment arms) divided by the total weight of the aircraft equals center of gravity.

Figure 5:
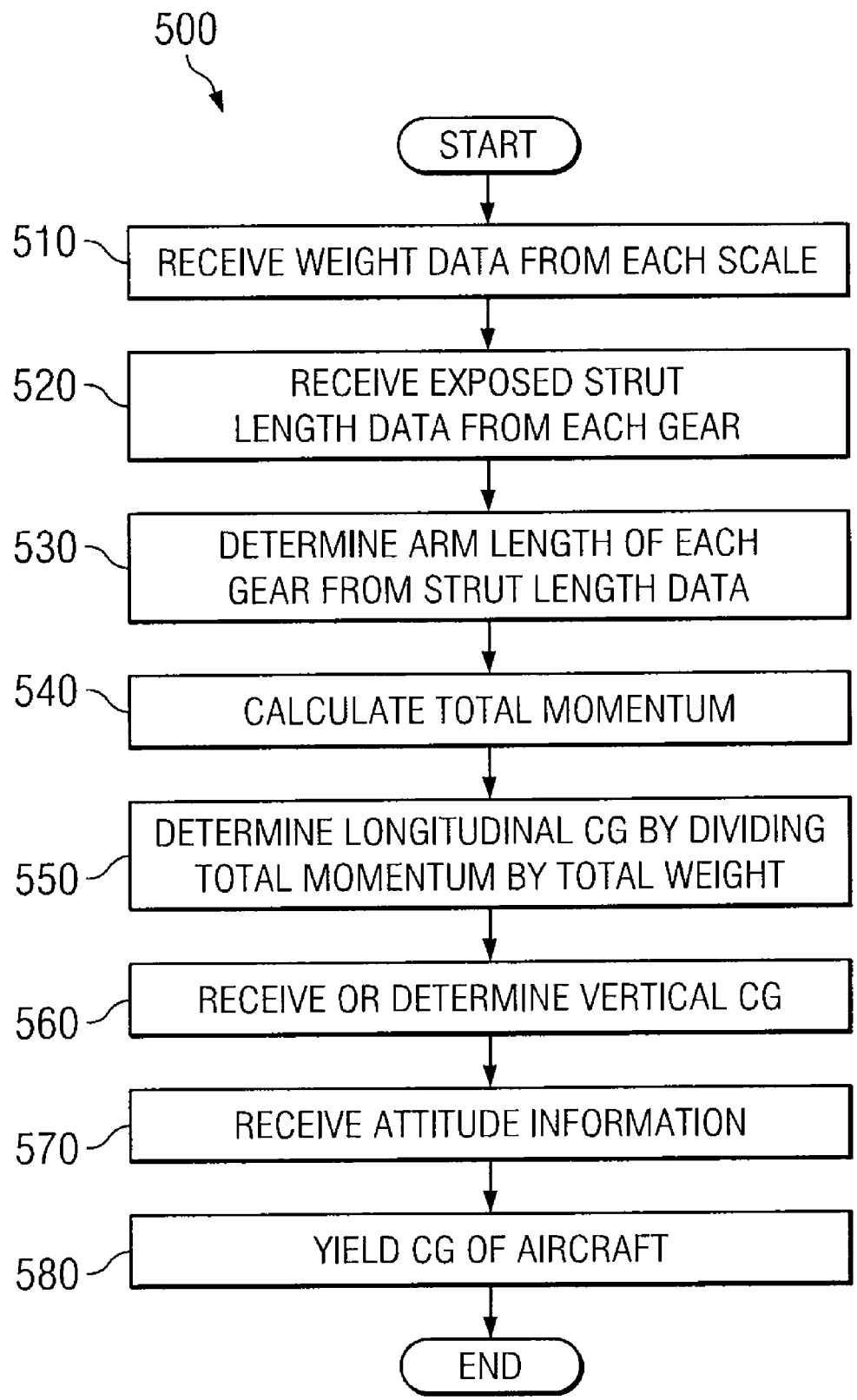
FIG. 5 illustrates a method that may be used to calculate the center of gravity, according to an embodiment of the disclosure.

The above data gathering and/or associated data manipulation techniques can be carried out for each respective type of aircraft to arrive at arm-calculating formulas. The arm-calculating formulas may then be stored in a computer or device, such as a remote device 600 described with reference to FIG. 6A below. Then, when a particular aircraft is encountered in a weighing/center of gravity determination process, the formulas may be utilized to speed up the measurement process and increase the measurement accuracy. FIG. 5 provides additional details of these calculations.

FIG. 5 illustrates a method 500 that may be used to calculate the center of gravity, according to an embodiment of the disclosure. In describing the method 500, reference is also made to a handheld device 600 of FIG. 6A, scales 610 of FIGS. 6B and 6C, and an exposed strut 630 and a caliper 620 of FIG. 6D.

In particular embodiments, some or all of the logic for executing the method 500 may be stored in a device, for example, the handheld device 600 described with reference to FIG. 6A. In other embodiments, some or all of the logic may be stored in another location, for example, a computer.

The method 500 may commence by receiving weight data from scales at step 510. Each landing gear and its respective wheels can be loaded onto a scale 610, for example as shown in FIG. 6B. For each scale, a weight value will be displayed, for example as shown with the scale 610 of FIG. 6C. The weight can be visually observed on, for example, a screen 612 of the scale 610 of FIG. 6C and manually entered into, for example, the handheld device 600 of FIG. 6A. Or, the handheld device 600 can wirelessly receive the weight measurements from, for example, the scale 610 of FIGS. 6B and 6C. An example handheld device 600/scale 610 system that can relay weight measurements wirelessly is provided by General Electrodynamics Corporation of Arlington, Tex. under the label AN60-6 Aircraft Platform Weight System. Other devices and/or systems may be utilized as well in other embodiments.

After step 510, the method 500 may proceed to a receiving of exposed strut length data from each gear at step 520. A length of an exposed strut 630 may be obtained by using calipers 620, for example as shown in FIG. 6D, by using a laser distance detector, or by using other suitable measurement techniques and/or devices. Once obtained, the value may be manually entered into or wirelessly communicated to the handheld device 600 of FIG. 6A.

After step 520, the method 500 may proceed to determining the arm length of each gear from the strut length data at step 530. In particular embodiments, step 520 may be carried out using, for example, formulas 428 and/or 438 of FIGS. 4B and 4C. In other words, the values obtained at step 520 may be entered into, for example, formulas 428 and/or 438 of FIGS. 4B and 4C to arrive at respective arm lengths for each respective gear. In particular embodiments, each of a variety of different aircrafts may have different formulas (e.g., as may be calculated using the process described with reference to FIGS. 4B and 4C) that correlate the strut lengths to the arm lengths. To facilitate which formulas to use, the handheld device 600 of FIG. 6A in particular embodiments may query a user as to which aircraft is being measured. Then, the corresponding formulas for the corresponding gears may be used for the particular selected aircraft.

After step 530, the method 500 may proceed to determining the total moment at step 540. In particular embodiments, step 540 may be carried out by multiplying the weight for each scale by the arm length for each scale as determined from step 530 and then adding all the yielded values together.

After step 540, the method 500 may proceed to determining the longitudinal center of gravity at step 550. In particular embodiments, step 550 may be carried out by dividing the total moment yielded at step 540 by the sum of the weights on all the scales (e.g., as may be received at step 510). The yielded result will be a linear distance. The discussion above generally refers to longitudinal center of gravity; however, the same steps may be used to calculate a lateral center of gravity (where needed), for example by using lateral moment arms as opposed to longitudinal moment arms.

After step 550, the method 500 may proceed to receiving or determining the vertical center of gravity of the aircraft at step 560. In particular embodiments, the vertical center of gravity information may be provided by an aircraft manufacturer. Accordingly, in such embodiments, the vertical center of gravity information may be stored in a lookup table on the handheld device 600. In other embodiments, where the vertical center of gravity is not available from a manufacturer, the vertical center of gravity may be calculated as follows:

$$CG_z = \frac{CG_x}{\text{Tan}\theta} - \frac{CG_{x'}}{\text{Sin}\theta}$$

where $CG_z$ is the vertical center of gravity from a reference datum, $\theta$ is the incline from a reference datum, $CG_x$ is the longitudinal center of gravity without the incline $\theta$, and $CG_{x'}$ is the longitudinal center of gravity with the incline $\theta$. In other words, the vertical center of gravity can be determined by determining the shift in longitudinal center of gravity over a particular inclination in the aircraft. In other words, the values at two different inclinations can be measured to determine the vertical CC. In particular embodiments, the above vertical center of gravity can be determined before execution of method 500 for a particular type of aircraft and stored in a lookup table to avoid repeating the vertical center of gravity determination.

After step 560, the method 500 may proceed to receiving attitude information at step 570. The attitude information in particular embodiments may be obtained using a digital inclinometer at the leveling lugs, at the leveling point of the aircraft, or at another suitable location.

After step 570 and with the vertical center of gravity, attitude information, and the longitudinal center of gravity, the method may proceed to determining the center of gravity of the aircraft at step 580. The yielding of the center of gravity may utilize simple geometric calculations (given vertical center of gravity, attitude information, and the longitudinal center of gravity) as will become apparent to one of ordinary skill in the art after review of this specification. As one non-limiting example, the attitude information provides an off-level indicator for the aircraft. In particular embodiments, a calculated lateral center of gravity may factor into determining the center of gravity of the aircraft.

Figure 6A:
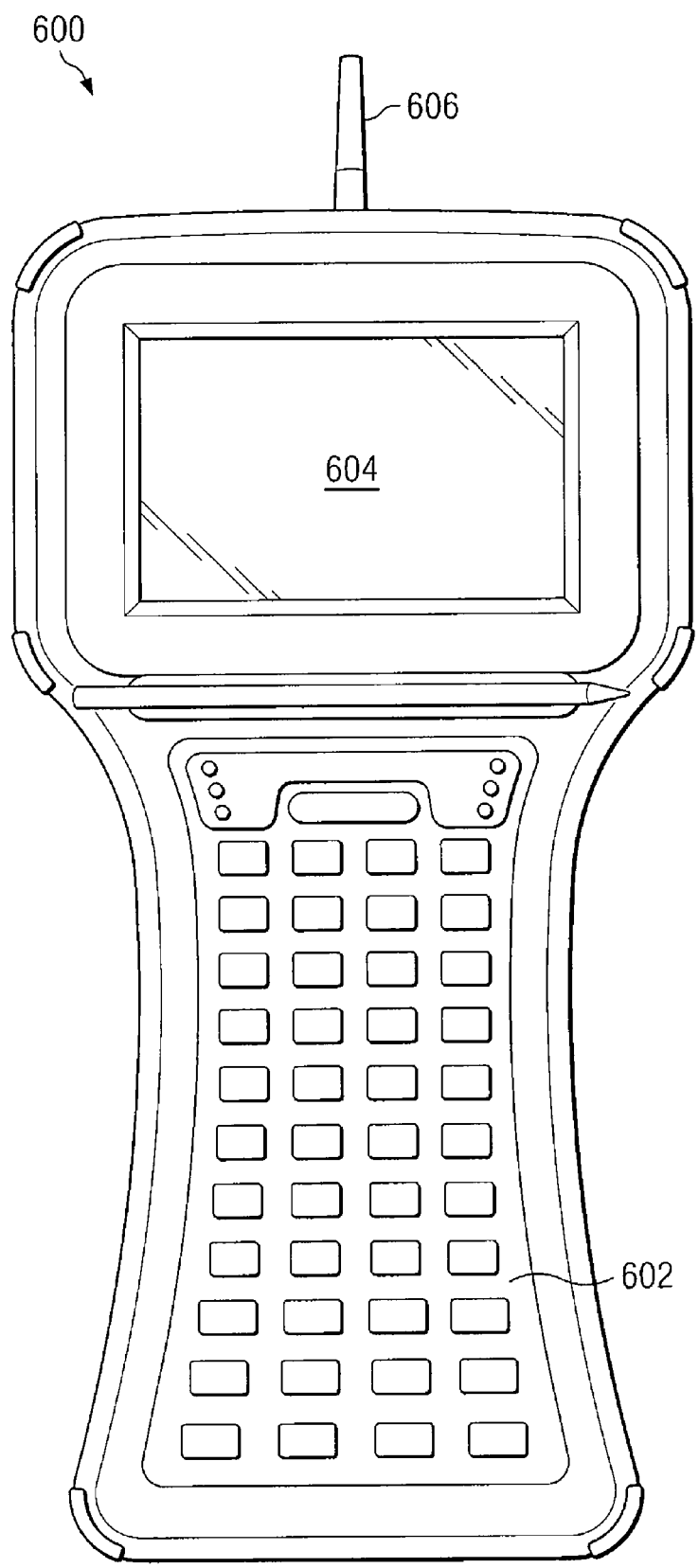
FIG. 6A illustrates a handheld device, according to an embodiment of the disclosure.
Figure 6B:
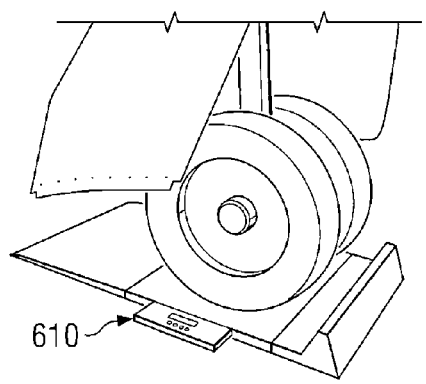
FIGS. 6B and 6C illustrate a weighing of aircraft on scales, according to an embodiment of the disclosure.

FIG. 6A illustrates a handheld device 600, according to an embodiment of the disclosure. The handheld device 600 may operate in the manner described with reference to the handheld device 110 of FIG. 1 to receive attitude information, weight information, and strut length information to yield the total weight and the center of gravity of the aircraft. In particular embodiments, the handheld device may be involved with the execution of logic for some or all of the steps of method 500.

The handheld device 600 in particular embodiments may include some, none, or all of the components reference above in FIG. 2. In this particular embodiments, the handheld device is shown with a keypad 602, a touchscreen display 604, and a wireless antenna 606 which may be used for a wireless receiving of information, including, but not limited to, weights and updates to memory in the wireless device.

In particular embodiments, the handheld device may operate on batteries and may be capable of being recharged. In other embodiments, the handheld device may be powered by a remote-powering technology, or a combination of batteries and a remote-powering technology. Remote powering technologies that may be employed by particular embodiments of the disclosure include, but are not limited to, WiTricity and Powercast.

Witricity was developed by a team at the Massachusetts Institute of Technology. Witricity uses resonant coupling to transmit power wirelessly between a transmitter and a receiver.

Powercast was developed by Powercast LLC of Ligonier, Pa. Powercast uses radio frequency transmission power capture technologies, including a circuit designed to capture propagated waves, to capture energy transmitted through the air.

Figure 6C:
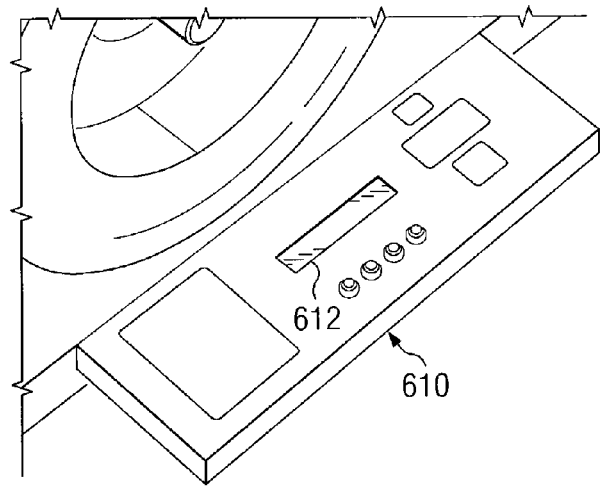
Figure 6D:
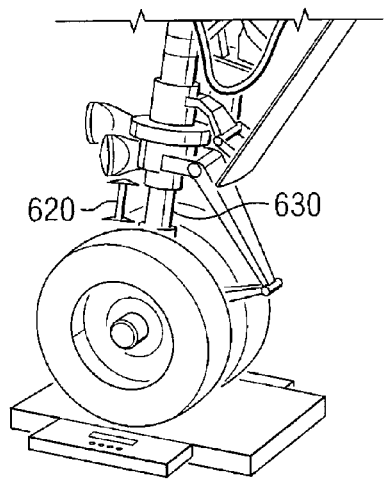
FIG. 6D illustrates a measurement of a strut length on a gear, according to an embodiment of the disclosure.

FIGS. 6B and 6C illustrate a weighing of aircraft on scales 610, according to an embodiment of the disclosure; and FIG. 6D illustrates a measurement of an exposed strut length 630 on a gear using calipers 620, according to an embodiment of the disclosure.

Figure 7:
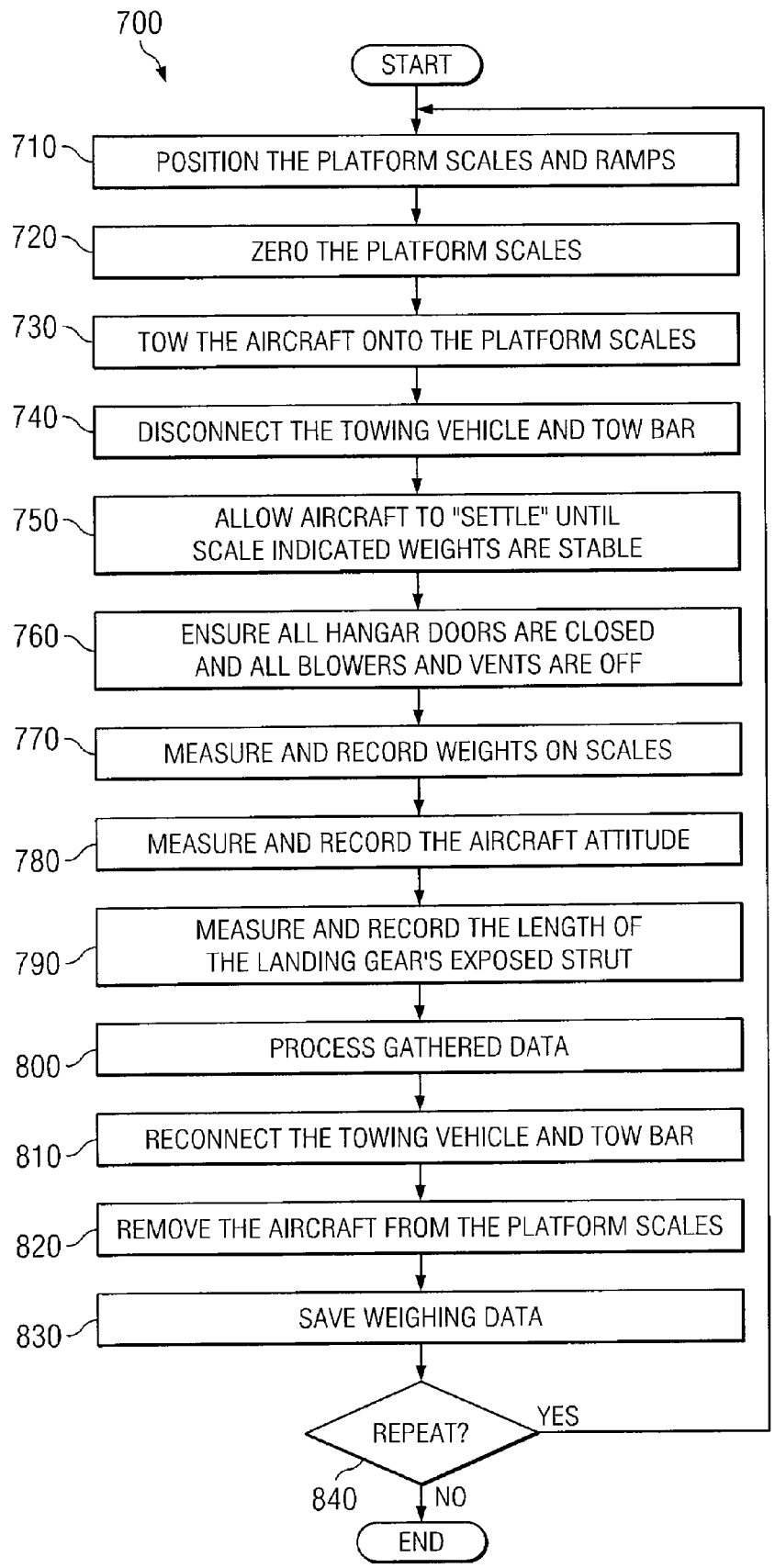
FIG. 7 shows a method of measuring an aircraft's weight and determining the aircraft's center of gravity, according to an embodiment of the disclosure.

FIG. 7 shows a method 700 of measuring an aircraft's weight and determining the aircraft's center of gravity, according to an embodiment of the disclosure. The method 700 in particular embodiments may use the device 600A of FIG. 6A and the method 500 of FIG. 5.

The method 700 commences by positioning the platform scales and ramps at step 710. In particular embodiments, each wheel or wheel set utilizes a scale. In particular embodiments, the AN60-6 Aircraft Platform Weight System may be utilized (provided by General Electrodynamics Corporation of Arlington, Tex.).

After step 710, the method 700 may proceed to a zeroing of the platform scales at step 720.

After step 720, the method 700 may proceed to a towing of the aircraft onto the platform scales at step 730. Any suitable towing device may be utilized, including, but not limited to, towing vehicles.

After step 730, the method 700 may proceed to a disconnecting of the towing vehicle and towing bar from the aircraft at step 740.

After step 740, the method 700 may proceed to an allowing of the aircraft to settle at step 750.

After step 750, the method 700 may proceed to an ensuring that the hangar doors are closed and all blowers and vents are off at step 760.

After step 760, the method 700 may proceed to acquiring weights at each of the respective scales at step 770. In particular embodiments, the handheld device 600 of FIG. 6A may wirelessly acquire the weights from each respective scale. In other embodiments, the weight from each respective scale may be read and manually entered into, for example, the handheld device 600 of FIG. 6A.

After step 770, the method 700 may proceed to measuring and recording the aircraft's attitude at step 780. The attitude information in particular embodiments may be obtained using a digital inclinometer at the leveling lugs, at the leveling point of the aircraft, or at another suitable location. The aircraft's attitude may recorded be within a computer or handheld device, for example, the handheld device 600 of FIG. 6A.

After step 780, the method 700 may proceed to a measuring and recording a length of each landing gear's exposed struts at step 790. In particular embodiments, the exposed strut length data may be ascertained by using calipers, for example as shown in FIG. 6D, by using a laser distance detector, or by using other suitable measurement techniques and/or devices. In particular embodiments and for particular aircraft the expose strut length may correspond to the amount of exposed chrome. The length of each of the landing gear's struts may be recorded within a computer or a handheld device, for example, the handheld device 600 of FIG. 6A.

After step 790, the method 700 may proceed to a processing of the gathered data at step 800, for example, using a computer or the handheld device 600 of FIG. 6A. In particular embodiments, the processing may follow some, none, or all of steps of the method 500 of FIG. 5 to yield the center of gravity and weight of the aircraft.

After step 800, the method 700 may proceed to a re-connecting of the towing vehicle and tow bar to the aircraft at step 810 followed by a removing of the aircraft from the platform scales at step 820. At step 830, the weighing data (including center of gravity information) may be saved and a determination may be made as to whether or not another aircraft needs to be measured at step 840. If so, the method may be repeat back to step 710. If not, the method 700 may end.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A method comprising:
   receiving a strut length and a weight for each of respective ones of a first plurality of gears of a first aircraft;
   for each one of the first plurality of gears of the first aircraft, determining an arm length based on the respective received strut length and a relationship between strut length and arm length for a respective corresponding gear of a second aircraft having a second plurality of gears corresponding in a one to one fashion to the first plurality of gears;
   determining a total moment of gravity of the first aircraft based on the weight for each of respective ones of the first plurality of gears, an attitude of the first aircraft, the first plurality of determined arm lengths, and a relationship between the center of gravity of the second aircraft and respective arm lengths for each of the second plurality of gears of the second aircraft;
   determining a center of gravity based on the total moment; and
   determining a mean aerodynamic chord of the first aircraft based on the first plurality of determined arm lengths and a relationship between the center of gravity of the second aircraft and respective arm lengths for each of the second plurality of gears of the second aircraft.

2. A method comprising:
   receiving a strut length for each of respective ones of a first plurality of gears of a first aircraft;
   for each one of the first plurality of gears of the first aircraft, determining an arm length based on the respective received strut length and a relationship between strut length and arm length for a respective corresponding gear of a second aircraft having a second plurality of gears corresponding in a one to one fashion to the first plurality of gears; and
   determining a center of gravity of the first aircraft based on the first plurality of determined arm lengths and a relationship between the center of gravity of the second aircraft and respective arm lengths for each of the second plurality of gears of the second aircraft.

3. The method of claim 2, wherein the relationship between strut length and arm length for the respective corresponding gear of the second aircraft is determined by:
   inflating a gear strut of the respective corresponding gear to a plurality of inflation levels;
   measuring the strut length and the arm length of the respective corresponding gear at each of the plurality of inflation levels; and
   fitting the measured strut lengths and respective measured arm lengths to a correlation formula.

4. The method of claim 3, wherein determining the center of gravity of the first aircraft comprises determining the center of gravity of the first aircraft based on the first plurality of determined arm lengths and the correlation formula for each corresponding gear of the second aircraft.

5. The method of claim 2, wherein determining the center of gravity of the first aircraft comprises determining a total moment of the first aircraft based on the first plurality of determined arm lengths and a relationship between the center of gravity of the second aircraft and respective arm lengths for each of the second plurality of gears of the second aircraft and determining the center of gravity based on the total moment.

6. The method of claim 2, and further comprising measuring an attitude of the first aircraft by a digital inclinometer, and wherein determining the center of gravity of the first aircraft comprises determining the center of gravity based on the measured attitude.

7. The method of claim 2, wherein receiving the strut length for each of respective ones of the first plurality of gears of the first aircraft comprises receiving, using a handheld device, the strut length for each of respective ones of the first plurality of gears of the first aircraft, the handheld device including at least a memory, a processor, and a wireless communication portion.

8. The method of claim 2, further comprising receiving a weight for each of respective ones of the first plurality of gears of the first aircraft, wherein determining the center of gravity of the first aircraft comprises determining the center of gravity of the aircraft based on the weight for each of respective ones the first plurality of gears of the first aircraft.

9. The method of claim 2, wherein determining the center of gravity of the first aircraft comprises determining the center of gravity according to a vertical center of gravity component provided by a technique selected from the group consisting of:
   receiving the vertical center of gravity component from a manufacturer of the first aircraft; and
   determining the vertical center of gravity component according to a longitudinal center of gravity component with an incline value of a reference datum and another longitudinal center of gravity component without the incline value.

10. The method of claim 2, wherein receiving the strut length for each of respective ones of the first plurality of gears of the first aircraft comprises receiving the strut length for each of respective ones of the first plurality of gears of the first aircraft using an entry technique selected from the group consisting of (i) manually entering the strut length into a handheld device and (ii) wirelessly receiving the strut length by the handheld device.

11. The method of claim 2, further comprising determining a mean aerodynamic chord of the aircraft based on the first plurality of determined arm lengths and a relationship between the center of gravity of the second aircraft and respective arm lengths for each of the second plurality of gears of the second aircraft.

12. A system comprising:
a computing system having a processor that executes instructions stored in a memory, the processor operable to:
receive a strut length for each of respective ones of a first plurality of gears of a first aircraft;
for each one of the first plurality of gears of the first aircraft, determine an arm length based on the respective received strut length and a relationship between strut length and arm length for a respective corresponding gear of a second aircraft having a second plurality of gears corresponding in a one to one fashion to the first plurality of gears; and
determine a center of gravity of the first aircraft based on the first plurality of determined arm lengths and a relationship between the center of gravity of the second aircraft and respective arm lengths for each of the second plurality of gears of the second aircraft.

13. The system of claim 12, wherein the processor is further operable to determine the relationship between strut length and arm length for the respective corresponding gear of the second aircraft by:
receiving the strut length and the arm length of the respective corresponding gear at each of a plurality of inflation levels of a gear strut of the respective corresponding gear; and
fitting the measured strut lengths and respective measured arm lengths to a correlation formula.

14. The system of claim 13, wherein the processor is further operable to determine the center of gravity of the first aircraft based on the first plurality of determined arm lengths and the correlation formula for each corresponding gear of the second aircraft.

15. The system of claim 12, wherein the processor is further operable to determine a total moment of the first aircraft based on the first plurality of determined arm lengths and a relationship between the center of gravity of the second aircraft and respective arm lengths for each of the second plurality of gears of the second aircraft, and determine the center of gravity based on the total moment.

16. The system of claim 12, wherein the processor is further operable to receive a measured attitude of the first aircraft from a digital inclinometer, and determine the center of gravity of the first aircraft based on the measured attitude.

17. The system of claim 12, further comprising a handheld case that houses the processor and the memory.

18. The system of claim 12, wherein the processor is further operable to receive a weight for each of respective ones of the first plurality of gears of the first aircraft, and determine the center of gravity of the first aircraft based on the weight for each of respective ones the first plurality of gears of the first aircraft.

19. The system of claim 12, wherein the processor is further operable to determine the center of gravity of the first aircraft according to a vertical center of gravity component provided by a technique selected from the group consisting of:
receiving the vertical center of gravity component from a manufacturer of the first aircraft; and
determining the vertical center of gravity component according to a longitudinal center of gravity component with an incline value of a reference datum and another longitudinal center of gravity component without the incline value.

20. The system of claim 12, wherein the processor is further operable to receive the strut length for each of respective ones of the first plurality of gears of the first aircraft using an entry technique selected from the group consisting of (i) manually entering the strut length into a handheld device and (ii) wirelessly receiving the strut length from a remote device.

21. The system of claim 12, wherein the processor is further operable to determine a mean aerodynamic chord of the aircraft based on the first plurality of determined arm lengths and a relationship between the center of gravity of the second aircraft and respective arm lengths for each of the second plurality of gears of the second aircraft.

* * * * *